United States Patent [19]

Gold et al.

[11] 4,102,492

[45] Jul. 25, 1978

[54] UNIVERSAL PROGRAMMABLE PROCESS CONTROL APPARATUS

[75] Inventors: Joseph Gold, Springfield; Frank Farese, Linden, both of N.J.

[73] Assignee: Valcor Engineering Corp., Kenilworth, N.J.

[21] Appl. No.: 819,875

[22] Filed: Jul. 28, 1977

Related U.S. Application Data

[63] Continuation of Ser. No. 700,300, Jun. 28, 1976, abandoned.

[51] Int. Cl.² .................. G06K 15/00; H01H 43/08; G06F 7/38; G05B 5/00
[52] U.S. Cl. .................. 235/375; 200/46; 235/92 T; 364/468
[58] Field of Search ........... 364/100, 468, 474; 235/375, 376, 92 T; 200/46

[56] References Cited

U.S. PATENT DOCUMENTS

| | | | |
|---|---|---|---|
| 3,164,731 | 1/1965 | Long | 235/61.6 R |
| 3,475,578 | 10/1969 | Vasiliev et al. | 235/61.6 R |
| 3,482,081 | 12/1969 | Peterson | 200/46 |
| 3,691,357 | 9/1972 | McIntosh | 364/474 |
| 3,739,157 | 6/1973 | Bobrowics et al. | 364/100 |

*Primary Examiner*—Daryl W. Cook
*Attorney, Agent, or Firm*—Darby & Darby

[57] ABSTRACT

Apparatus for selectively enabling and disabling a process depending on the instantaneous value of a measurement made during the process in accordance with a predetermined program recorded by shading adjacent segments on an area of a record means the length of which is an analog of the total range of the measurement with each of the segments representing an interval of the measurement during which the process is to be enabled or disabled. A plurality of memory cores in one to one correspondence with subsegments of the measurement range analog are caused during programming to occupy one of two bistable states in response to a light sensor responsive to the light originating from an incident source and reflected by the program record. After programming, the memory cores are interrogated in accordance with the instantaneous value of measurement and a process control switch is set to a state corresponding to the state of the last interrogated memory core.

22 Claims, 8 Drawing Figures

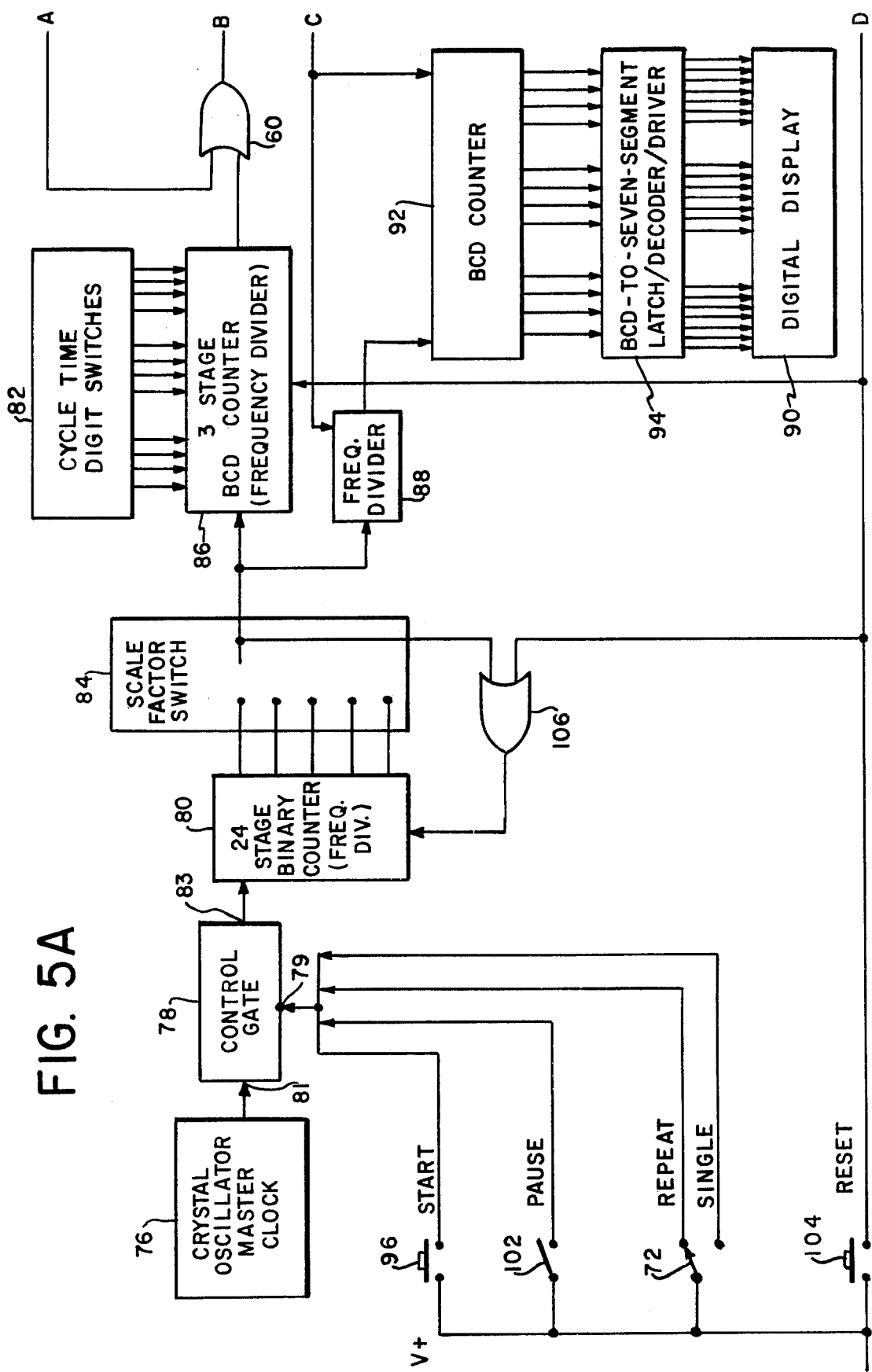

UNIVERSAL PROGRAMMABLE PROCESS CONTROL APPARATUS

This application is a continuation of U.S. Pat. application Ser. No. 700,300, now abandoned, filed June 28, 1976 for UNIVERSAL PROGRAMMABLE PROCESS CONTROL APPARATUS.

BACKGROUND OF THE INVENTION

It is known in the art of automatic process control, wherein machines are employed to sequentially carry out the steps of a process, to alternately enable and disable machines respectively associated with each step of the process in accordance with a predetermined program. It may be desirable to control the order of performance of the process steps and the duration of each step as a function of absolute time as measured by a clock or in accordance with the instantaneous position of a movable part of a machine employed in the process. It is further known in the art to utilize mechanical cams to actuate switches for enabling and disabling the machinery associated with the various steps of the process which cams move in response to the movement of a clock or the movement of the machine part upon which enabling of the process steps depends.

It is also known in the art of process control to utilize means in which electronic signals may be stored according to a predetermined program for governing the sequence and duration of the process steps. In such devices electronic switches are programmed to enable and disable the machinery associated with the respective process steps according to a predetermined sequence. The start and stop points for each step and the duration of each step are set by manually actuating switches associated with various points in the process cycle or by utilizing a keyboard electrically connected to a memory to establish switching points at which the machinery for accomplishing the various steps of the process is to be enabled and disabled. An example of the manually set process control apparatus is the solid-state limit programmer series SLP/SNA manufactured by Sequential Information Systems, Inc. of Elmsford, New York. An example of the keyboard type of process control apparatus is the Model M1000 Programmable Limit Switch manufactured by National Controls Corporation of Addison, Illinois.

Both of the aforementioned programmable devices are disadvantageous in that the process control program must be manually entered each time the process is to be run by manually setting each point in the process control cycle. Where the process control machinery is to repeat a previous process different from the process last executed by the machine the program must again be manually entered. Manual entry of a program step by step is time-consuming and provides an opportunity for errors in programming the control apparatus. It is therefore desirable to provide a process control apparatus for which a program may be facilely recorded and the record of the program used diretly to program the control apparatus. It is further desirable that the programming of the record for use in process control require little skill and present to the operator a readily visible pattern representative of the process sequence.

A particularly desirable format for recording a process program involves the use of a program card having parallel ruled lines with the length of an area defined by adjacent lines being an analog of the total range of the meausrement of which process control is a function. The measurement analog is subdivided into segments which are shaded to indicate one state of an output process enabling switch used to enable and disable a machine associated with one or more process steps with the remaining unshaded segments being analogous to values of the process control measurement during which the output switch is to occupy the other of its enabling and disabling states. A number of adjacent program areas may be provided on a single program card with each area associated with a separate respective output switch used during the process cycle.

The National Controls Corporation Model M1000 Programmable Limit Switch employs a card on which a program is drawn by shading segments of a ruled strip. The card is placed face up on the programming portion of the device adjacent the keyboard so that the programmer may keypunch the program into the apparatus while viewing the card. Since the program card must be read by the programmer and the program then keypunched by the programmer to insert the information on the card into the process controller memory it is possible that the keypunched program may differ from the program shown on the card due to keypunching errors and/or misreading of the card by the programmer.

SUMMARY OF THE INVENTION

The present invention overcomes the problems of the prior art in providing a universal programmable process control apparatus wherein a program may be readily drawn on a program record card by shading segments of an analog of the range of a measurement of which the process is a function. Insertion of the program card into the apparatus is all that is necessary to program the apparatus for the desired process control and the card may be withdrawn and kept for subsequent use when it is desired to repeat the process associated with the program recorded on the record card.

Specifically, the invention provides for apparatus for selectively enabling and disabling a process depending on the instantaneous value of a measurement of a parameter which measurement is made during the process. The process is enabled and disabled in accordance with a predetermined program which is recorded on a record means such as a card which has a surface with a light reflectance characteristic. Programming is accomplished by selectively changing the light reflectance characteristic of alternating segments of the record card's surface along a portion of the surface on which there is defined an area bounded at one end by an origin point and at the other end by an end point.

Each of the segments consists of one or more equally spaced subsegments each having an analog in the range of measurements with the total distance between the origin point and the end point an analog of the total range of the measurement. The process is enabled when the subsegment which is an analog of the instantaneous measurement has one light reflectance characteristic and disabled when that subsegment has the changed light reflectance characteristic. Each instantaneous measurement has as its analog the subsegment which includes a point displaced from the origin point by a distance equal to the distance between the origin point and the end point multiplied by the ratio of the instantaneous measurement to the total range of the measurement.

The invention comprises a housing having a receptacle through which the record means containing the program is moved for programming the apparatus, a light source mounted in the housing for directing a beam of light upon the program subsegments as the record is moved through the receptacle, means for sensing the light from the light source reflected by the subsegments of the record means, a plurality of memory core means in one to one correspondence with the subsegments each of which memory core means has a first state corresponding to the inherent reflectance characteristic of the surface of the program record card and a second state corresponding to the changed reflectance characteristic of the program record card, program enabling means responsive to movement of the record means through the receptacle for sequentially enabling each memory core means with each memory core means being responsive to the light sensing means and the program enabling means for occupying the first state when the subsegment corresponding to the memory core means has the inherent reflectance characteristic of the program record card and for occupying the second state when the subsegment has the changed reflectance characteristic, measurement means having an output signal with a magnitude indicative of the instantaneous value of the measurement of which process control is a function, interrogating means responsive to the output signal for determining the state of the memory core means corresponding to the subsegment having an analog within the range of measurements in which the instantaneous measurement lies and output switch means responsive to the interrogating means which output means has a first state for enabling the process and a second state for disabling the process with the output switch means occupying its first state when the interrogated memory core means is in its first state and the output switch means occupying its second state when the last interrogated memory core means is in its second state.

The apparatus of the present invention may be used to control a process in accordance with absolute time in which case the measurement means includes a clock or timing apparatus having an output dependent on time. Alternatively the measurement may be of the position of a machine part in which, for example, an encoder may be used to provide a signal indicative of the instantaneous position of the machine part.

It is therefore an object of the instant invention to provide a process control apparatus which may be programmed to actuate one or more process control switch means at predetermined times in accordance with the instantaneous value of a measurement made during the process.

Another object of the invention is to provide a process control apparatus which includes means for reading a program recorded on a record means as an analog of the measurements of which process control is a function.

Still another object of the invention is to provide a process control apparatus which may be used as a timer for enabling and disabling process steps at predetermined times in the process cycle.

A further object of the invention is to provide a process control apparatus which can enable and disable a process in accordance with the position of a movable part according to a predetermined program recorded on a record means as an analog of the positions of the part.

Other and further objects of the invention will be aparent from the following drawings and description of a preferred embodiment in which like reference symbols are used to indicate like parts in the various views.

DESCRIPTION OF THE PREFERRED EMBODIMENTS

Figure 1:
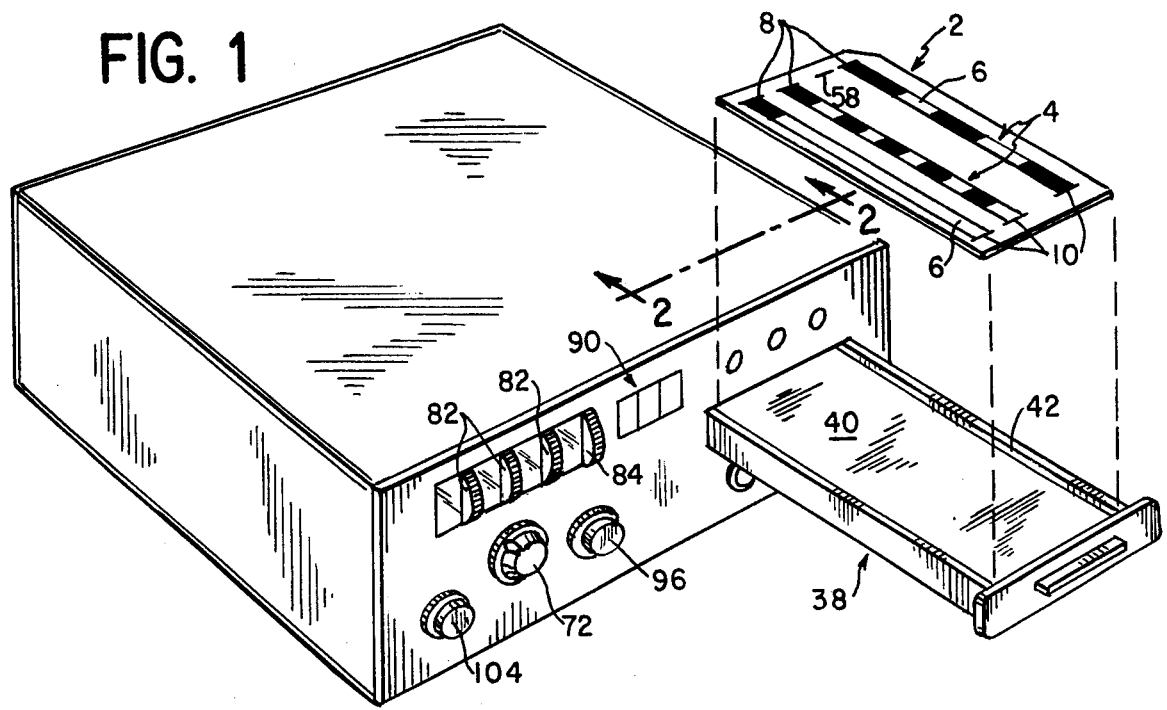
FIG. 1 is a perspective of the apparatus of the invention.
Figure 4:
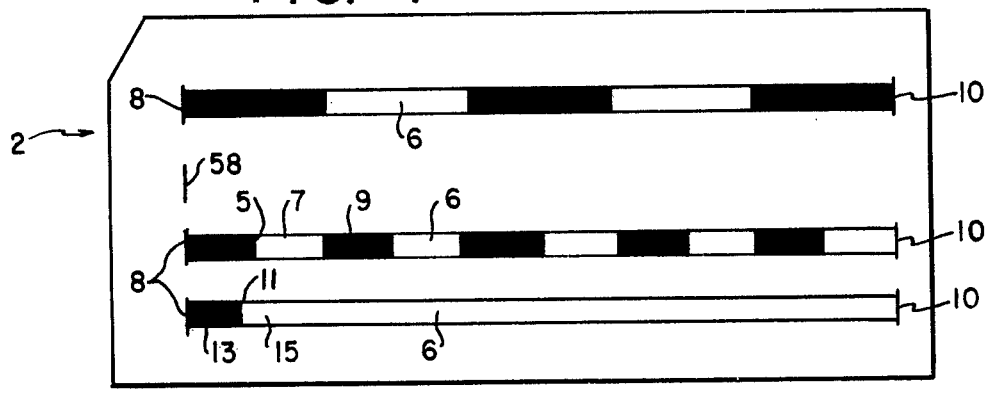
FIG. 4 is a view of a record card means used in conjunction with the invention.

Referring now to FIGS. 1 and 4, there is shown a record means 2 in the form of a card on which there are preprinted pairs of parallel horizontal lines 4. The pairs of horizontal lines 4 define respective elongated areas 6 between each pair of horizontal lines 4. At one end of each area 6 there is an origin point 8 and at the other end of each area 6 there is an end point or terminus 10. The length of the area 6 measured between the origin point 8 and end point 10 is an analog of the total range of a measurement which determines the state of an output switch associated with the respective area 6 to enable and disable at least a portion of the process apparatus.

In the record card means of FIG. 1, the distance from the origin point 8 to the end point 10 can be approximately 6½ inches. This distance is an analog of the total range of the measurement used to govern the process.

Each program area 6 is subdivided into a predetermined number of subsegments in one-to-one correspondence with a plurality of memory cores which comprise the process control apparatus memory. In the preferred embodiments of the invention, each area 6 comprises 512 subsegments. The number of subsegments may be greater or lesser depending on the degree of resolution desired as will hereinafter become apparent. The greater the number of subsegments, the greater the resolution, i.e., the precision with which a process operation time may be achieved.

In one embodiment of the invention wherein the process is to be controlled according to real time, the measurement of which process control is a function will be time and will thus have the units of time. For example, if the total time for a process cycle is to be 65 seconds then the 6½ inch distance between the origin point 8 and end point 10 will represent the full 65 second cycle time. That is the linear distance measured from the origin point 8 will be an analog of the elasped time measured from the point in time at which the process cycle begins.

Each of the areas between adjacent horizontal lines 4 can be subdivided into process control segments comprising one or more subsegments by drawing transverse lines at points analogous to the desired switching times of the output control switch associated with the respective area between horizontal lines 4. The surface of the record card means 2 has an inherent reflectance property which can be utilized for segments which are to represent one desired switching state for the output control switch. The reflectance characteristic of alternate segments may be changed to indicate another switching state for the output control switch associated with the alternate segments. Thus, if a white or light colored record card is employed, alternating segments may be left blank as at 7 to indicate one state for the output control switch and the remaining in-between segments can be shaded with a common pencil or other marking means as at 9 to make the segments associated with the other state of the output control switch non-reflecting. Shading is one convenient way to designate the switching segments. However, it is within the scope of the invention to make other alterations to the reflectance characteristics of the surface of the record card, as for exaple by changing its color and sensing the different colored segments.

The distance of each vertical line separating adjacent segments from the origin point is an analog of the time at which switching of the output control switch is to occur. Thus, a vertical line drawn ½ inch from the origin point as at 11 (note the scale of FIG. 4 is less than lfie size) to separate adjacent segments on either side of that vertical line indicates that switching is desired at substantially 5 seconds after start of the process cycle from the output switching state associated with the reflectance characteristic of the segment 13 between the zero point and the vertical line ½ inch therefrom to the switching state associated with the reflectance characteristic of the segment 15 lying to the right of the vertical line 11 separating the adjacent segments 13 and 15. Where the switching states of the output control switch are "open" to turn off the process machinery associated with the output control switch and "closed" to turn on that portion of the process control machinery, unshaded areas may be used to indicate time periods during which the portion of the process control machinery is to be off (output switch open) and shaded segments may be used to indicate time periods during which the portion of the process control machinery is to be on (output switch closed).

Shading of appropriate segments to program the process control apparatus may be accomplished by any conventional pen or pencil which leaves a mark capable of impeding or altering the reflectance of light incident upon the shading. The program record card can have preprinted on it a pair of horizontal axis lines 4 for each of several process control channels each process control channel having associated with it a separate respective output control switch. Thus, for use in a 3-channel process control apparatus having three respective output switches a program record card would have three pairs of parallel spaced lines 4 each having a length representing 100% of a common total range for the measurement of which process control is a function. The area between each pair of parallel lines 4 can be subdivided independently into segments defining the sequence of operations of the respective output switch associated with the channel area.

Figure 2:
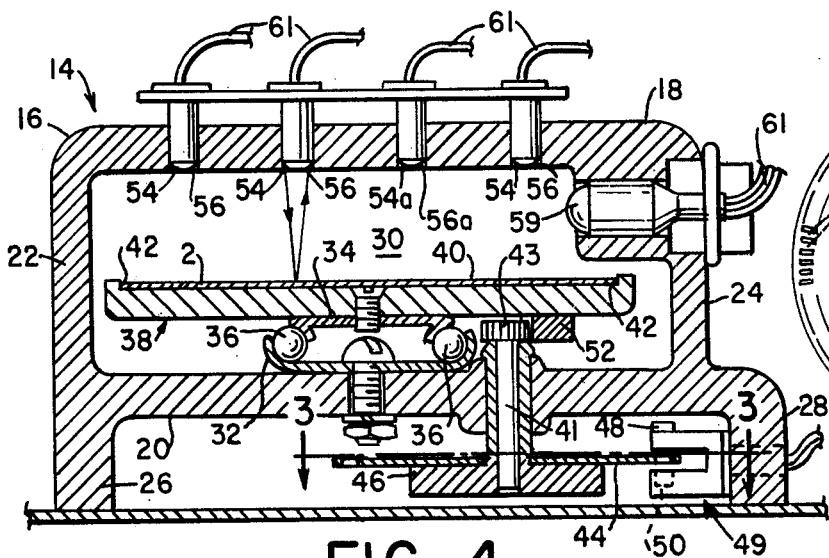
FIG. 2 is a sectional elevation taken through line 2—2 of FIG. 1.

Referring now to FIG. 2, there is shown apparatus for reading a completed program record card 2. A card reader 14 comprises a housing 16 having a top 18, a bottom 20 and sidewalls 22 and 24 terminating beneath the bottom 20 in respective leg portions 26 and 28.

The housing 16 has a generally rectangular opening 30 with a track 32 fixedly mounted to the bottom 20 of the housing 16. Slidably mounted on the track 32 is a slide 34 movable along the length of the track 32. Ball-bearings 36 can be used to facilitate the sliding of the slide 34 relative to the track 32. Fixedly mounted on the slide 34 is a tray 38 having an upper surface 40 and sidewalls 42. The tray 38 is slidable in and out of the opening 30 of the housing 16 due to the mounting arrangement of the slide 34 and track 32.

Figure 3:
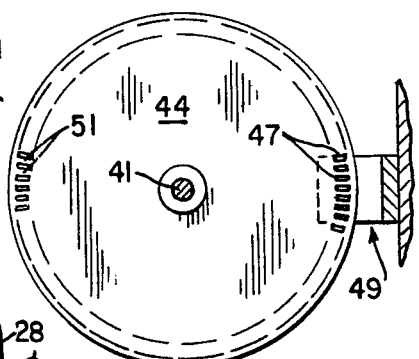
FIG. 3 is a sectional plan view taken through line 3—3 of FIG. 2.

Rotatably mounted within an opening adjacent the bottom 20 of the housing 16 adjacent the track 32 there is a shaft 41 with one end disposed in the rectangular opening 30 adjacent the track 32 on which there is fixedly mounted a gear 43 for rotation with the shaft 41. The other end of the shaft 41 extends beyond the bottom 20 of the housing 16 and has fixedly mounted on it a flat circular disc 44 (see FIG. 3) with uniformly spaced apertures 47 adjacent the circumference of the disc 44. A locking hub 46 fixedly mounted on the shaft 41 holds the disc 44 in place on the shaft 41 for rotation with the shaft 41.

Fixedly mounted to the leg portion 28 adjacent the disc 44 there is an optical switch 49 having a light source 48 incident upon a light sensor 50. The optical switch 49 is shown to the art and one such device suitable for use in the apparatus of the invention is the "Opto switch" STCT-IS-060WB manufactured by Sensor Technology, Inc. This optical switch includes a light-emitting diode, phototransistor, amplifier and Schmidt trigger. The switch 49 turns "on" and "off" as the beam of light from the light source 48 to the sensor 50 is interrupted and permitted to resume.

The optical switch 49 is positioned relative to the disc 44 with the apertured circumference of the disc 44 passing through the light beam emitted by the light source 48 and received by the light sensor 50 so that as the disc 44 rotates the light beam is interrupted by the portions 51 of the disc separating the apertures. The light beam is permitted to reach the sensor 50 as the apertures 47 align with the light beam. Thus, as the disc 44 rotates in response to movement of the tray 38 into the housing 16 the output of the optical switch 48 turns on an off to enable programming as will subsequently be described. A retroreflective disc or a magnetic disc with appropriate sensors may also be employed.

Fixedly mounted to the underside of the tray 38 there is a rack 52 the length of which is parallel to the direction of movement of the tray 38 as it is slid in and out of the housing 16. The teeth of the rack 52 mesh with the teeth of the gear 43 so that as the tray 38 is slid in and out of the housing 16 the gear 43 rotates causing the shaft 41 and disc 44 to rotate with it.

Fixedly mounted within openings in the top 18 of the housing 16 on a common axis transverse to the direction of movement of the tray 38 are one or more light sources 54 each having associated with it a light sensor 56. A lamp 59 is mounted on one of the sidewalls 24 of the housing 16 and provides light to each of the light sources 54 by means of fiber optic paths 61 connecting the lamp 59 with each of the light sources 54. Alternatively, each of the light sources 54 may comprise a self-contained source of light such as a light emitting diode. The light sources 54 are positioned to direct a beam of light downward normal to the surface 40 of the tray 38.

In programming the process control apparatus the program record card 2 is placed face-up on the surface 40 of the tray 38 with its length parallel to the direction of movement of the tray 38 in and out of the housing 16. The light sources 54 are spaced along their common transverse axis so that the light beams emitted by them project upon the areas 6 between parallel lines 4 on the program record card 2 when the program record card 2 is placed on the surface 40 of the tray 38 and slid with the tray 38 into the housing 16. The tray walls 42 are separated by a distance substantially equal to the width of the program record card 2 to insure proper alignment of the segmented areas on the program card 2 with the light sources 54.

Each light source 54 and its corresponding light sensor 56 is associated with a respective program channel for controlling an associated output control switch of the process control apparatus. As the tray 38 with the program card 2 upon its surface is slide into the housing 16 the light beam from the associated light source 54 is reflected back to the associated light sensor 56 only as the unshaded segments pass through the light beam. When the shaded segments pass through the light beam from the light source 54 the reflection back to the associated sensor 56 is diminished and may be considered negligible in that it is not sensed.

The sensor 56 has a two-state output. The output of the sensor 56 is switched between its two states according to whether the sensor receives the beam of light from the light source 54 reflected by the unshaded segments or whether there is no reception of reflected light when the shaded segments pass beneath the light source 56. The switched outputs of the light sensors 50 and 56 are utilized to store the information conveyed by the shaded segments in the process control apparatus memory as will later be described.

In order that the placement of the origin points 8 of the program areas of the respective channels on the record card 2 not be critical with respect to the edges of the card and the position of the record card 2 in the tray 38 with respect to the length of the tray 38 not be critical, an additional light source 54a and light sensor 56a can be provided to sense the presence of a start mark 58 on the program record card 2 in alignment with the origin points 8 of the program areas 6. As the program card 2 on the tray 38 is slid into the housing 16 the process control apparatus programming circuitry responds to the unshaded surface of the program record card to the left of the origin points 8 as shown in FIG. 4. However, when the start mark 58 passes beneath its respective light source 54a, interrupting the reflected beam of light from the card 2 to the respective light sensor 56a, the output of the light sensor 56a in response to the detection of the start mark 58 puts out a signal resetting the programming circuitry as will subsequently be described.

Figure 5B:
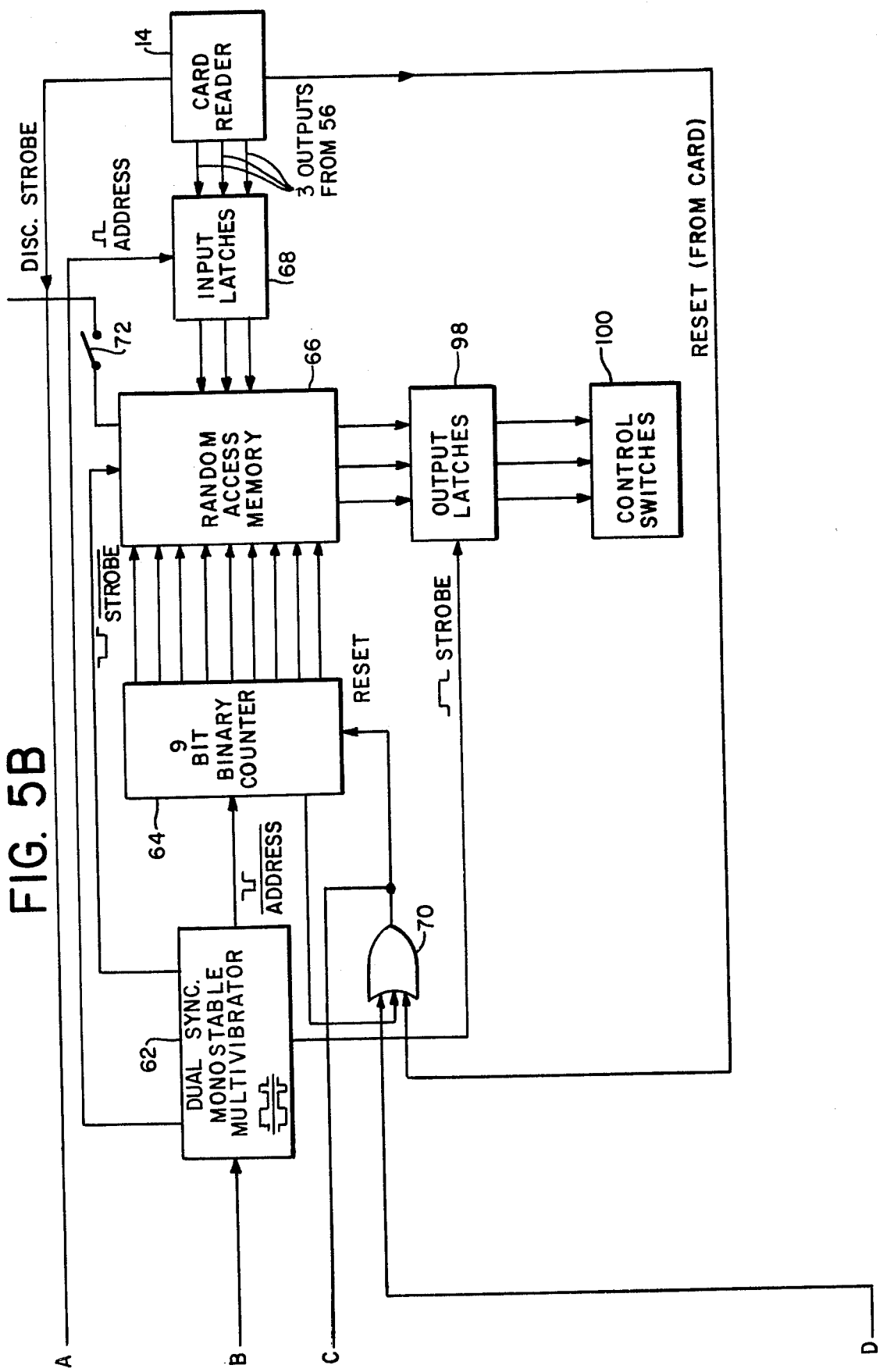
FIGS. 5a and b are a functional block diagram of one preferred embodiment of the invention.

Referring now to FIGS. 5a, b, the circuitry of the process control apparatus is shown in block diagrammatical form. Except for the card reader 14, the components of the process control apparatus represented by the blocks in FIGS. 5a, b are known to those familiar with the art and it is only their cooperative arrangement as defined in the claims which follow this disclosure that are deemed within the scope of the invention.

The card reader 14 utilizes a disc strobe output signal from the light sensor 56a associated with the start mark 58 to commence programming. The disc strobe output is applied to one input of an OR gate 60. At the output of the OR gate 60 there is produced in response to the disc strobe signal a pulse which is applied to a dual synchronous monostable multivibrator 62. The multivibrator 62 puts out four output pulses in predetermined relationship each time a pulse is applied to its input. The first output pulse of the multivibrator 62 is an address pulse having a pulse width of approximately 2 microseconds. The second output pulse of the multivibrator 62 is the inverse of the address pulse. The address pulse and its inverse are produced simultaneously. Immediately following the address pulse and its inverse are a strobe pulse having a pulse width of approximately 7 microseconds and the inverse of the strobe pulse occurring simultaneously with the strobe pulse.

The inverse of the address pulse is applied to a 9 bit binary counter which counts from 0 to 511, a total of 512 counts with the count being incremented by one unit each time the inverse address pulse is applied to the 9 bit binary counter 64. The counter 64 is selected to have 9 bits in order to count up to 512 subsegments within the area 6 on the program card 2 for a single programming channel. Fewer or greater numbers of subsegments can be employed depending on the degree of resolution desired in switching during the process cycle and the bit capacity of the counter 64 is determined according to the number of subsegments chosen. The 9 bit counter 64 permits up to 512 subsegments, a number deemed suitable for most applications. Each time an inverse address pulse is applied to the 9 bit counter the count in the counter 64 is incremented by 1 until a count of 511 after which the counter is reset to zero in response to the next inverse address pulse. For convenience, a larger capacity counter such as a 12 bit counter may be employed with three of the bit positions disabled so that the larger counter functions as a 9 bit counter.

The output of the 9 bit binary counter 64 is a digital representation in binary form of the count in the counter 64. Each of nine outputs of the binary counter 64 corresponding to a respective one of the 9 bits has a high or low state. One of the high and low states indicates a logical 0 and the other of the high and low states indicates a logical 1. The digital binary output of the 9 bit binary counter represents a unique address of a memory core storage device in a random access memory 66.

The random access memory 66 can comprise a 512 × 1 static CMOS random access memory model S2222 or S2222A device manufactured by American Microsystems Inc. for each program channel. Each random access memory device has 512 memory switching cores each of which can occupy one of two states. For example, each memory switching core may conduct an electrical current when in one state (providing a logical 0 output) and prevent current conduction in the other of its states (providing a logical 1 output). A separate 512 memory core device is provided for each of the programming channels associated with a program card area made up of 512 subsegments. There is a one-to-one correspondence between each subsegment in a channel programming area on the program card 2 and the 512 memory cores in the corresponding device of the random access memory 66.

Each of the memory cores of the random access memory 66 is enabled in sequence during programming according to the output count of the 9 bit binary counter 64. That is, each memory core of the random access memory 66 has a unique address between 0 and 511 with only the memory core having the address equivalent to the output count of the binary counter 64 being enabled for programming at any given time.

Simultaneous with the inverse address pulse there is generated by the dual synchronous monostable multivibrator 62 an address pulse which is applied to an input latch 68, there being a separate input latch for each of the programming channels. Thus, in a 3-channel process control apparatus there are three input latches 68 all of which simultaneously are actuated by the address pulse from the dual synchronous monostable multivibrator 62 simultaneously with addressing of the memory cores in the random access memory 66. When actuated, each of the input latches 68 provides at its output a signal corresponding to the input signal applied to it at the time of actuation. The signal remains constant until the next address pulse is applied to the input latch.

The outputs of the three light sensors 56 associated with the respective program channel areas on the program card 2 are each applied to one of the input latches 68. Thus, each input latch 68 is associated with a corresponding light sensor 56 and is latched in one state when the light sensor 56 detects an unshaded segment on the program card 2 and is latched in another state when the light sensor 56 detects a shaded segment on the program card 2. Data transfer from the light sensor 56 to its respective input latch 68 occurs as each subsegment in a channel program area on the program card traverses the beam from its respective light source 54.

The number of apertures in the disc 44 is related to the ratio of the number of teeth in the gear 43 to the number of teeth in the rack 52. This relationship is such that the product of the number of revolutions made by the disc 44 from the passage of the origin points 8 until the passage of the end points 10 beneath the respective light sources 56 and the number of apertures in the disc 44 is equal to the number of subsegments, that is 512 in the preferred embodiment. Hence, the total number of apertures that pass through the optical switch 49 as the record card 2 traverses the linear distance between the start mark 58 and the end points 10 is equal to 512. As each subsegment traverses the light beam from the light source 54 a disc strobe pulse is generated by the light source 50 causing the dual synchronous monostable multivibrator 62 to increment the 9 bit binary counter 64. The new count in the binary counter 64 enables the memory core of the random access memory 66 having an address corresponding to the newly sensed subsegment to be programmed at one of its two states with the data stored in the associated latch 68, that is according to whether the newly sensed subsegment is shaded or unshaded.

Immediately following the address pulse and its inverse the dual synchronous monostable multivibrator 62 puts out the strobe pulse and its inverse. The inverse of the strobe pulse is applied to the random access memory 66 to cause the memory core in the random access memory 66 having an address equal to the present count in the binary counter 64 to switch to one of its two states depending on the current state of the input latch 68. Thus, for example, when the input latch associated with one of the three programming channels is in a state indicating that the last sensed subsegment is unshaded it will cause the memory core in the random access memory 66 associated with the one channel having an address equal to the count in the 9 bit binary counter 64 to occupy a state indicating that the subsegment to which the addressed memory core corresponds is unshaded.

At the commencement of the programming procedure, the process control apparatus is initialized as follows: the output of the light sensor 56a in response to detection of the start mark 58 is applied to the input of an OR gate 70 the output of which is a pulse in turn applied to the binary counter 64. The output pulse from the OR gate 70 causes the 9 bit binary counter to reset to a count of 0. A program switch 72 (see FIG. 1), located on the front panel of the process control apparatus and accessible to the operator, when placed in a "program" position causes a read signal to be applied to the random access memory 66 to receive data from the input latches 68.

Programming occurs as follows: the program card 2 with program area segments shaded as desired for each of three programming channels is placed on the tray 38 and slid into the housing 16 of the process control apparatus. The card is positioned on the tray 38 with the start mark end of the card closest to the housing 16. As the card is slid into the housing 16 the start mark is sensed by the light sensor 56a associated with the start mark 58 and the light sensor 56a puts out a card reset signal which is applied to the 9 bit binary counter 64 through the OR gate 70. The 9 bit binary counter is then reset to zero in response to the output signal from the OR gate 70.

As the tray 38 is pushed further into the housing 16 the first subsegments of the three respective channel areas pass beneath their respective light sources 54 and the light they reflect, if any, is sensed by the respective light sensors 56. The output indications of the light sensors 56 as to whether or not the sensed subsegments are shaded are stored in respective input latches 68 in response to the disc strobe signal. The disc strobe signal from the light sensor 50 applied to the dual synchronous monostable multivibrator 62 through the OR gate 60 causes the respective memory core having an address of zero in each of the three 512 bit random access memories 66 to accept the data from the respective input latches 68 for storage.

As the program card 2 is pushed further into the housing 16 the next subsegments of the three respective program areas of the card 2 pass beneath their respective light sources 54 while the light sensor 50 of the optical switch 49 puts out another disc strobe signal. The dual synchronous monostable multivibrator 62 in response to an output signal from the OR gate 60 in turn responsive to the disc strobe signal increments the binary counter 64 by generating an inverse address pulse so that the memory core in each of the three random access memories 66 having an address of 1 records the data newly stored in the input latches 68 indicating whether the second subsegments from the origin points 8 of the three channel areas are shaded or unshaded. In this manner all 512 of the memory switches in each of the three random access memory devices associated with the three respective programming channels are caused to occupy one of two possible states depending upon whether the respective subsegments of the three program areas on the card 2, in one-to-one correspondence with the addressed memory cores are shaded or unshaded. After the program card is fully inserted into the housing 16 so that all 512 subsegments of each program channel area have passed beneath the respective light sources 54 the process control apparatus is fully programmed and the program card may be withdrawn and saved for future use.

Execution of the stored program will now be described in conjunction with a process control apparatus wherein process control is a function of real time. Where time is the measured parameter of which process control is a function, the length of the program channel areas 6 on the program card 2 is an analog of the total process cycle time. In the preferred embodiment of the invention the total process cycle time may be preselected by the operator as will hereinafter be described. Each of the 512 subsegments which comprise the length of the program area on the card 2 have as an analog one 512th of the selected process cycle time.

In apparatus for controlling a process as a function of time a crystal oscillator master clock 76 is provide which generates at its output pulses at a relatively high fixed frequency. The crystal oscillator clock 76 used in the preferred embodiment generates pulses at a frequency of 2.048 MHz. The output of the clock 76 is applied to the input 81 of a control gate 78 which has a control input 79. When a positive D.C. voltage is applied to the control input 79 of the control gate 78 the control gate provides at its output 83 the clock pulses from the crystal oscillator 76. When the required D.C. voltage is not applied to the control input of the control gate 78 there is no output from the control gate 78. The output of the control gate 78 is applied to a 24 stage binary counter as will be known to those familiar with the art.

On the front panel of the process control apparatus there are provided three thumbwheel digit switches 82 and a thumbwheel scale factor switch 84. The scale factor switch 84 is rotated to select the units of time by which the numerical representation of the digit switches 82 is multiplied to define the total cycle time. In the preferred embodiment of the invention the following time intervals may be selected as units of time to be multiplied by the digital setting of the digit switches 82: 100 seconds, 10 seconds, seconds, 10 minutes, and 10 hours. The previous units have been found convenient for most processes but the invention is not limited to cycle times measured in these units and virtually any units can be used according to the teachings of the invention.

A three stage BCD counter 86 which functions as a frequency divider receives pulses from the output of the 24 stage binary counter 80. The 24 stage binary counter 80 and three stage BCD counter 86 are operatively connected to the scale factor switch 84. The output stage of the 24 stage binary counter 80 from which pulses are to be applied to the three stage BCD counter 86 is determined by the setting of the scale factor switch 84. For example, if the cycle time is to be measured in units of seconds, the output of the stage of the 24 stage binary counter 80 selected will be the stage providing pulses at a rate of 512 pulses per second. The frequency of the pulses applied to the three stage frequency divider 86 from the 24 stage binary counter 80 according to the position of the scale factor switch 84 are further divided in the three stage frequency divider 86 by a factor according to the setting of the thumbwheel digit switches 82. Suitable circuitry for accomplishing the pulse frequency divisions in accordance with the settings of the switches 82 and 84 will be known to those familiar with the art. Thus, if the total cycle time is to be 100 seconds, the frequency divider 86, that is, 512 pulses per second, will be divided by 100 so that pulses are provided at the output of the three stage frequency divider 86 at a rate of 5.12 pulses per second.

The pulses applied to the input of the three stage frequency divider 86 are simultaneously applied to a frequency divider 88 which is operatively connected to a digital elapsed time display 90 on the front panel of the process control apparatus through self scanned three digit BCD counter 92 and a BCD-to-seven-segment latch/decoder/driver 94. The frequency of the pulses from the selected output of the 24 stage binary counter 80 is divided by 512, that is the number of subsegments and memory cores, in the frequency divider 88 which has its output connected to the BCD counter 92. The pulses from the output of the frequency divider 88 are counted in the BCD counter 92 which provides at its output the pulse count in binary coded decimal form. The output of the BCD counter 92 is applied to the BCD-to-seven-segment latch/decoder/driver 94 which provides at its output appropriate signals to energize selected segments of the seven segment indicating digits employed in the elapsed time display 90.

The elapsed time display 90 is a multiplexed three digit LED display. Multiplexing the display so that the three digits are sequentially lit and extinguished at rapid frequency reduces power requirements from those necessary for the simultaneous lighting of all three digits of the elapsed time display 90.

As the pulses from the selected output of the 24 stage binary counter 80 are simultaneously applied to the three stage counter 86 and the frequency divider 88 the elapsed time display 90 shows an incremented count from zero upward to the selected process cycle time according to the setting of the switches 82 and 84. The time for the complete count is equal to the selected cycle time. This is readily seen from the previous example. As pulses are applied to the frequency divider 88 at a rate of 512 pulses per second their frequency is divided by 512 in the divider 88 so that the output of the frequency divider 88 consists of pulses provided at a frequency of 1 per second. Thus the count down shown on the elapsed time display 90 is incremented at a rate of one increment per second until the three stage counter 86 reaches the count defined by the setting of the digit switches 82 which in the example is 100. The process is terminated at the end of the 100 seconds at which time the count in the 9 bit counter 64 equals 511 and the elapsed time indicator 90 displays "100". Output pulses from the three stage frequency divider then cease unless the process control apparatus is in a repeat mode as will subsequently be explained.

When a single run of a process cycle is desired the rotary control switch 70 is turned to a "single" position. The switch 72, which is operatively connected to the random access memory 66 and control gate 78, when in the "single" position, enables reading of the information stored in the random access memory 66, that is, the states of the memory cores of the random access memory 66 may be determined.

To start the process control cycle actuation of a start button 96 on the panel of the apparatus which is operatively connected between the system power supply and the control gate 78 causes the control gate 78 to conduct pulses from the master clock oscillator 76 to the 24 stage binary counter 80. The pulses are then scaled down in frequency according to the desired process cycle time indicated by means of the thumbwheel digit switches 82 and the thumbwheel scale factor switch 84 and applied to the OR gate 60 at a frequency equal to the total number of subsegments in each channel program area of the record card 2 (which is also equal to the number of memory cores in each channel's random access memory 66) divided by the selected cycle time. Thus, for the case where there are 512 subsegments and the selected cycle time is 100 seconds, pulses are applied to the OR gate 60 at a rate of 5.12 pulses per second. At the output of the OR gate 60 there are provided pulses having the frequency of the pulses applied to the input of the OR gate from the frequency divider 86 which output pulses are applied to the dual synchronous monostable multivibrator 62.

As explained previously in the discussion of the programming of the process control apparatus the output of the dual synchronous monostable multivibrator comprises four pulses emitted in response to each input pulse applied to the multivibrator 62. The inverse address pulse is applied to the 9 bit binary counter 64 thereby incrementing the count in the counter 64 which is provided in binary form at the output of the counter 64. The address pulse applied to the input latches during programming is not used during execution of the process cycle and the position of the switch 72 in the single mode and out of the program mode prevents the random access memory 66 from receiving information from the input latches 68.

After the 9 bit binary counter 64 is incremented by the inverse address pulse the inverse strobe pulse which follows the inverse address pulse enables the memory core in the random access memory 66, which has an address equal to the count in the binary counter 64, to be interrogated. Where there are mutliple channels the memeory core in each random access memory device associated with each respective channel and having an address equivalent to the count in the 9 bit binary counter 64 is simultaneously interrogated. The data output of the random access memories 66 indicative of whether the associated process machinery is to be enabled or disabled following interrogation of the memory is applied, upon interrogation of the memory, to respective output latches 98 where the data is stored until the next memory cores are interrogated. The strobe pulse from the multivibrator 62 is applied to a control input of the output latches 98 to cause the data in the addressed memory cores to be stored in the output latches 98.

The data stored in the output latches 98 is applied to an output device which can include control switches 100 for operating portions of machinery employed in the execution of the process. The control switches 100 are caused in response to application thereto of the data signals stored in the output latches 98 to occupy states dependent upon the states of the respective channel memory cores last interrogated. The memory cores in turn have stored in them analogs of the programming information according to the shading of their corresponding subsegments on the program record card 2. Hence there is a correspondence between the state of the output control switches 100 during any given time interval in the selected range and the shading of the subsegments on the program record card 2 which are analogous to the time interval.

It may be desired during the execution of the process to halt the process and then at a later point in time continue the process from the point whereat it was halted. A pause position is provided on the panel switch 72. When the switch 72 is in the pause position, a pause switch 102 connected between the power supply and the control gate 78 closes. Switching to the pause position causes the control gate 78 to inhibit passage of the pulses from the master clock oscillator 76 to the 24 stage binary counter 80. When it is desired to resume process execution the selector switch 72 is rotated from the pause position to a position where the control gate again permits pulses to be applied to the 24 stage binary counter 80. The 9 bit binary counter then continues its count from where it left off when the pause switch was actuated and the process cycle continues from the point at which it was interrupted. The selector switch 72 can also have a repeat position in which the control gate continues to apply pulses to the 24 stage binary counter at the completion of the process cycle after the count in the 24 stage binary counter 80 reaches the limit set by the switches 82 and 84 thereby initiating another process cycle. Switching of the power supply voltage to the control input of the gate 78 to accomplish single and repeat cycle runs will be known to those familiar with the art.

The frequency divider 88 and the binary counter 64 are reset to zero in response to a reset signal generated at the end of each process cycle. The reset signal is provided automatically by the binary counter 64 when it reaches its final count, that is, the count equal to the number of subsegments and memory cores, e.g., 512. The reset signal from the binary counter 64 is applied to the OR gate 70. The output of the OR gate 70 is applied to the binary counter 64, the frequency divider 88, and the BCD counter 92 thereby resetting all of the counters to zero to initialize the system. Initialization of the system may also be accomplished manually by actuating a reset button 104 on the front panel of the process control apparatus. The reset button is connected between the power supply and an input to the OR gate 70. Upon actuation of the reset button 104 the OR gate 70 is caused to provide a reset pulse at its output which initializes the system as previously described.

In addition to resetting counters 64, 88 and 92 the manual reset switch 104 also resets the 24 stage binary counter 80 and the 3 stage counter 86. The reset signal from the power supply is applied through the reset switch 104 directly to the 3 stage counter 86 and to one input of an OR gate 106 which has an output connected to the 24 stage binary counter 80 for resetting the counter 80 to zero. The other input of the OR gate 106 is connected to the 3 stage counter 86 so that when the 3 stage counter 86 reaches the count selected according to the digit switches 82 and scale factor switch 84 the 24 stage binary counter 80 is automatically reset to zero and therefore ready to count for the next process cycle.

As previously stated, the apparatus of the invention may be used to control processes as a function of measurements other than real time. For example, programming of the apparatus for operating a process cycle as a function of shaft angular position can be accomplished with the same program reader and associated circuitry as used in programming the process apparatus for operating according to a function of time. In this case, the segments of the program card 2 can represent angular positions rather than intervals of time. There are some modifications to the circuitry for execution of the process which are illustrated in FIG. 6. Any measurement the instantaneous value of which can be expressed by electrical signals may be employed to control a process.

Figure 6A:
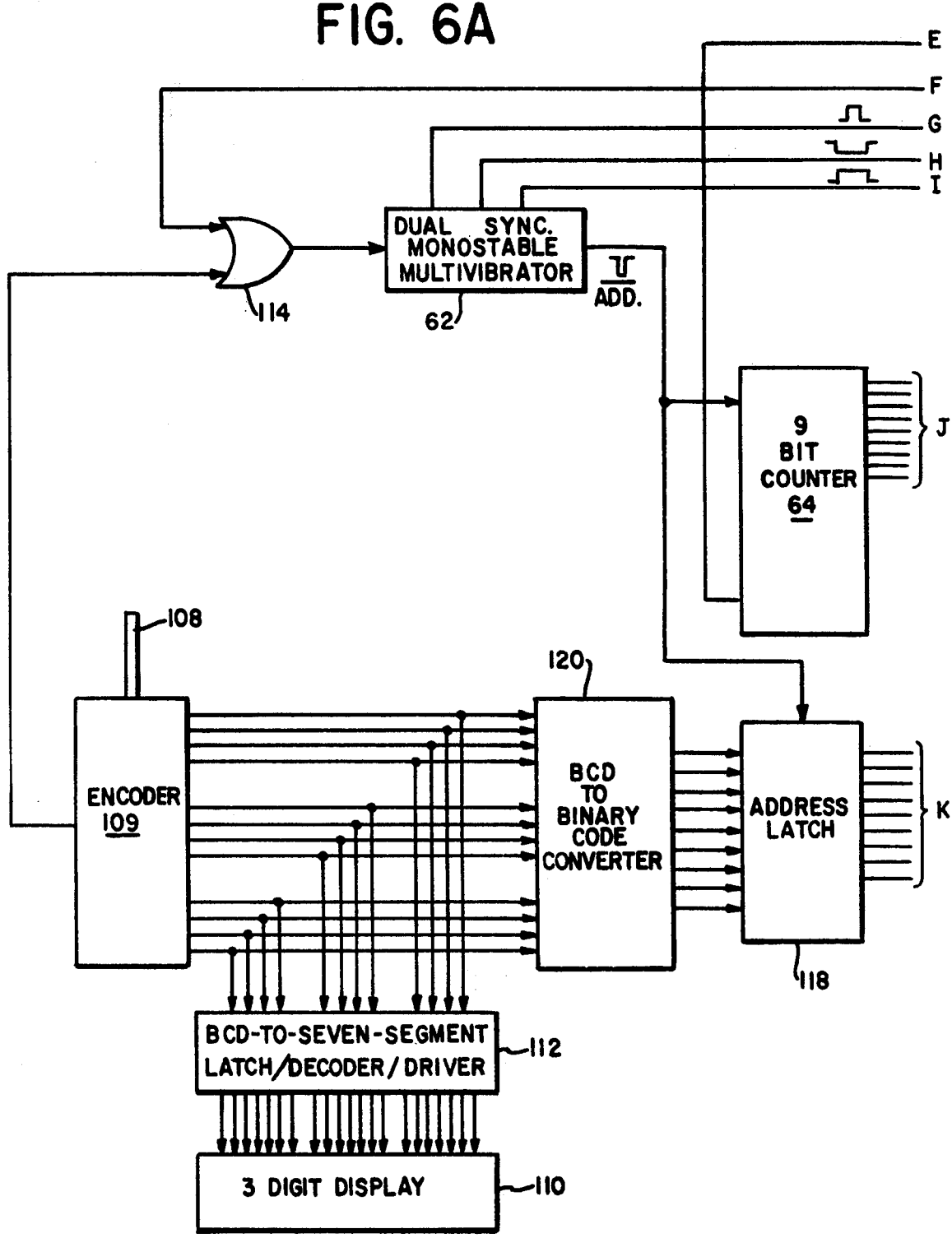
FIGS. 6a and b are a functional block diagram of a modified preferred embodiment of the invention.
Figure 6B:
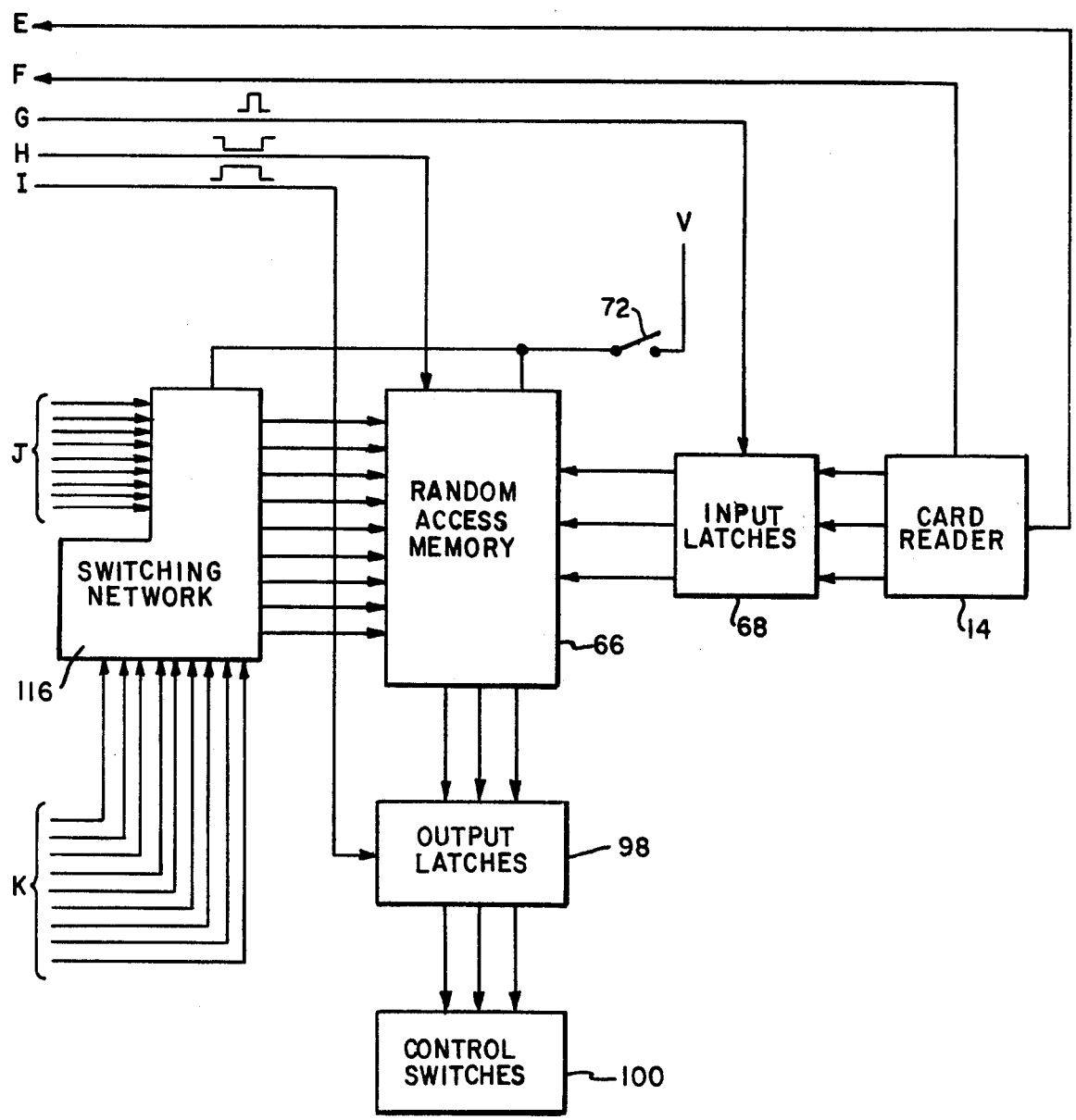

Referring now to FIGS. 6a, b, apparatus is shown, according to the invention, for controlling a process as a function of the angular position of a rotatable shaft. In the apparatus illustrated in FIGS. 6a, b where parts similar to those in FIGS. 5a, b are indicated by like reference numerals, the total process cycle duration has as its analog one complete revolution of a shaft 108. Thus, the total length of a program channel area on the program record card 2 may be deemed to be proportional to 360°. Where a 512 subsegment system is employed, each subsegment represents an angular position in an angular interval having a length of 360°/512. Thus the first subsegment on the program record measured from the origin point 8, in a 512 subsegment system will represent angles between 0° and 360°/512, the second subsegment will represent angles in the range of between 360°/512 and 720°/512, the third subsegment will represent angles in the range between 720°/512 to 1080°/512, etc. with the total of the angular intervals equaling 360°. Process cycle ranges other than 360° may be selected with apparatus similar to that disclosed in conjunction with the system illustrated in FIGS. 5a, b wherein a variable time cycle is provided.

In the system of FIGS. 6a, b the shaft 108 is fixedly mounted to an absolute shaft angle encoder 109 having a three digit BCD output. A multiplexed three digit display 110 similar to the elapsed time display 90 displays the shaft angle of the encoder in digital form. The output of the encoder 109 is applied to a BCD-to-seven-segment latch/decoder/driver 112 similar to the latch decoder driver 94. Since the output of the encoder 109 is in BCD form the output of the encoder may be applied to the latch/decoder/driver 112 directly. If an encoder having a binary output is used a binary to BCD converter must be employed between the encoder 109 and latch/decoder/driver 112.

The encoder 109 includes an encoder strobe unit which provides 360 pulses per revolution of the shaft 108 or one pulse per degree of revolution. Thus, the encoder 109 has two outputs, the first being a BCD representation of the absolute position of the shaft 108 and the other being a pulse generated with each degree of revolution. For convenience, the process control apparatus used to control a process as a function of shaft angular position can be a 360 subsegment system. That is, the program channel areas on the program record card 2 can be subdivided into 360 subsegments and the circular disc 44 of the program reading apparatus can be provided with an appropriate number of apertures such that 360 apertures traverse the light beam in the optical switch 49 as the record card 2 traverses the length of the program areas 6. For the 360 subsegment case only the first 360 memory cores of the random memory devices are connected in the system so that they reset to zero after a binary count of 359 is reached.

Programming of the shaft angle controlled apparatus is similar to programming of the timer apparatus of FIGS. 5a, b. The count of the 9 bit counter 64 is applied to the random access memory 66 through a switching network 116. The switching network 116 is similar to a 9 pole double throw switch which is switched to one of its two positions to receive address data from the 9 bit binary counter 64 during programming and to pass that address information on to the random access memory 66 for programming the memory cores as previously described. When switched to its other position, the switching network 116 disconnects the 9 bit binary counter 64 from the random access memory 66 and instead applies data from an address latch 118 to the random access memory 66 for interrogation of the memory cores during execution of the process.

A BCD to binary code converter 120 converts the BCD output of the encoder 109 indicating instantaneous shaft angle position to binary for storage of the binary representation of the shaft position in the address latch 118. As the shaft 108 is rotated during execution of the process one strobe pulse from the encoder 109 is applied to the OR gate 114 with each degree of rotation of the shaft 108 resulting in an output pulse at the output of the OR gate 114 which is in turn applied to the dual synchronous monostable multivibrator 62. As previously described in conjunction with the explanation of the time controlled apparatus shown in FIGS. 5a, b the inverse strobe pulse from the dual synchronous monostable multivibrator 62 enables the memory core of the random access memory 66 having the address last stored in the address latch 118, to be interrogated to determine its programmed state. The address pulse in the dual synchronous monostable multivibrator 62 is, again, not used during execution of the process and only serves a function during programming as in the case of the timer. The inverse address pulse is applied to the address latch simultaneously with the generation of the address pulse to permit the binary representation of the instantaneous shaft angle position to be stored in the address latch. Following the address and inverse address pulses are the strobe and inverse strobe pulses. The inverse strobe pulse, as previously stated, enables the addressed memory core to be interrogated while the strobe pulse is applied to the output latches 98 causing the data stored in the interrogated memory cores of the random access memory 66 to be stored in the output latches 98. The information stored in the output latches 98 is applied to the output control switches 100 in order to turn on and off the portion of machinery associated with each respective programming channel in accordance with the program stored in the random access memory 66.

The shaft 108 may be connected to one portion of the process machinery to make the operation of other portions of the process machinery dependent upon the position of the one portion of the process machinery.

As previously stated, the number of subsegments employed in the process control apparatus system is virtually unlimited. The number of subsegments may be altered simply by changing the number of apertures in the disc 44 and/or the gear ratio between the gear 43 and rack 52 so that the light beam of the optical switch 49 is interrupted, as the record card 2 is moved through the length of the program areas 6, a total number of times equal to the desired number of subsegments and providing an equal number of memory core devices in the random access memory 66 for each of the programming channels. In apparatus where process control is a function of shaft position, it is not necessary that 360 subsegments be employed. For example, if the increased resolution available from the 512 bit random access memory is desired a 512 subsegment system similar to that employed with the timing apparatus may be used with the encoder 109 modified as follows.

The encoder may be provided with one output disc to give BCD data covering the range of 0° to 360° for use with the multiplex display 110 and a separate output disc counting in binary from 0 to 511 as a single revolution of the shaft 108 is made. If a binary output disc is employed the BCD to binary code converter 120 may be eliminated. In the latter case the program record card 2 will actually employ 512 subsegments but the programming area on the record card 2 may, for convenience, still be subdivided into 360 divisions. That is, it is not necessary that the programmer be directly concerned with the number of actual subsegments read by the apparatus when preparing a program. The programmer will generally prepare the program by subdividing the record card program area 6 into segments which are composed of one or more subsegments, each segment representing a continuous period of time during which an associated output control switch 100 is to occupy a process enabling or disabling state.

Although examples of the apparatus have been given in which process control is achieved as a function of time and of shaft angle position respectively, other measurements may be employed in similar process control apparatus within the scope of the invention. Furthermore, various permutations and combinations of the disclosed circuitry components may be made while operating in accordance with the teachings of the invention and without departing from the spirit of the invention. Hence, while the invention has been disclosed in terms of two examples of a preferred embodiment its scope is not limited to the preferred embodiment but only by the following claims.

What is claimed is:

1. Apparatus for selectively enabling and disabling a process depending on the instantaneous magnitude of a measurement made during the process in accordance with a prescribed program comprising:
a control switch actuable between a process enabling state and a process disabling state,
a plurality of memory core means each of which can be selectively placed in one of a first state and a second state,
measurement means for determining the instantaneous value of a parameter which value is variable during the process, said measurement meang having a measurement output signal with a characteristic having a magnitude indicative of the instantaneous magnitude of said measurement, and
means responsive to said measurement output signal for sequentially interrogating the memory core means in order to determine the state of the interrogated memory core means, said control switch means being responsive to said interrogating means for being in said enabling state when the interrogated memory core means is in its first state and for being in said disabling state when the interrogated memory core means is in its second state.

2. Apparatus according to claim 1 wherein said measurement means comprises:
means for generating timing signals at equally spaced time intervals and
means for counting said time signals, said counting means including an output at which there is provided said output signal having a characteristic with a magnitude indicative of the number of timing signals generated.

3. Apparatus according to claim 1 wherein said measurement means comprises:
a rotatable member which is rotated as a function of said process, and
encoder means fixedly connected to said rotatable member for rotation therewith, said encoder means having an output at which there is provided said output signal having a characteristic with a magnitude indicative of the angular position of said rotatable member.

4. Apparatus for selectively enabling and disabling a plurality of respective process operations depending on the instantaneous magnitude of a measurement made during the process in accordance with a prescribed program comprising
a plurality of control switches, each independently actuable between a process enabling state and a process disabling state.
a plurality of memory means in one to one correspondence with said control switches, each memory means comprising a plurality of memory core means each of which can be selectively placed in one of a first state and a second state,
measurement means for determining the instantaneous value of a parameter which value is variable during the process, said measurement means having a measurement output signal with a characteristic having a magnitude indicative of the instantaneous magnitude of said measurement,
means responsive to said measurement output signal for interrogating the memory core means for each of the respective memory means in order to determine the state of each respective memory core means in each of the memory means, each of said control switch means being responsive to said interrogating means for being in said enabling state when the interrogated memory core means in the memory means associated with said control switch is in its first state and for being in said disabling state when the interrogated memory core means of the memory means associated with said switch means is in its second state.

5. A universal programmable timer for process control comprising:
a plurality of memory core means each of which can be placed in one of a first state and a second state,
means for generating timing signals at a constant frequency,
means for counting said timing signals and providing an output signal with a characteristic having a magnitude indicative of the time elapsed from the commencement of said process,
means responsive to said counter output signal for sequentially interrogating each memory core means in order to determine the state of said interrogated memory core means, and
control switch means responsive to said interrogating means for enabling said process when said interrogated memory core means is in its first state and for disabling said process when said memory core means is in its second state.

6. In apparatus including a control switch for selectively enabling and disabling a process depending on the instantaneous magnitude of a measurement made during the process in accordance with a prescribed program for alternating said process control switch between a process enabling state and a process disabling state, the program being recorded on a designated area of the surface of a record means which area is bounded at one end by an origin and at the opposite end by a terminus, by dividing said area into adjacent segments alternate ones of which have one reflectance characteristic and the remaining ones of which have a different reflectance characteristic, said segments comprising one or more equally sized sub-segments each of which is an analog of an interval within the total range of the magnitude of said measurement, with the total distance between said origin and said terminus being an analog of the total measurement magnitude range, said control switch being in said enabling state when the instantaneous magnitude of the measurement is in an interval having a sub-segment with one reflectance characteristic as an analog and said control switch being in said disabling state when the instantaneous magnitude of the measurement is in an interval having a sub-segment with said different reflectance characteristic as an analog, the improvement which comprises:
a housing having an opening through which said record means is moved for programming said apparatus, means for providing a first energy wave incident upon said sub-segments as said record means is moved through said opening, means for sensing the energy reflected by said sub-segments in response to said incident first energy wave, a plurality of memory core means in one to one correspondence with said sub-segments each of which memory core means has a first state corresponding to said one reflectance characteristic of said record means and a second state corresponding to said different reflectance characteristic of said record means, means responsive to movement of said record means through said opening for sequentially enabling each memory core means to be placed in one of said first and second states in response to said sensing means, each enabled memory core means being placed in said first state when its corresponding sub-segment has said one reflectance characteristic and in said second state when its corresponding sub-segment has said different reflectance characteristic, measurement means for determining the instantaneous value of a parameter which value is variable during the process, said measurement means having a measurement output signal with a characteristic having a magnitude indicative of the instantaneous magnitude of said measurement, means responsive to said measurement output signal for interrogating the memory core means corresponding to the sub-segment which is an analog of the interval in which said instantaneous magnitude lies in order to determine the state of the interrogated memory core means, said control switch means being responsive to said interrogating means for being in said enabling state when the interrogated memory core means is in its first state and for being in said disabling state when the interrogated memory core means is in its second state.

7. Apparatus according to claim 6 wherein said means responsive to movement of said record means comprises:

means for holding said record means to prevent movement with respect thereto, said holding means being movable with said record means held thereon into said housing opening, additional energy wave sensor means, a source of additional energy waves incident on said additional sensor means, a movable member disposed in the path through which said additional energy waves travel from said source of additional energy waves to said additional energy wave sensor means, said movable member being operatively connected to said holding means and movable only in response to movement of said holding means, said movable member further having spaced first portions and alternating second portions disposed between said first portions, said first portions having a first effect on said additional energy waves incident upon said first portions and said second portions having a second effect on said additional energy waves incident upon said second portions, said first effect being different from said second effect, said member being movably mounted relative to said additional energy source and said additional sensor means so that said first and second portions alternately traverse the path of said additional energy waves from their source to said additional sensor means thereby alternately having said first effect and said second effect on said additional energy signals, said additional sensor means providing one output associated with said first effect and another output associated with said second effect and hence responsive to the movement of said holder means for providing a signal to said memory core means for enabling each said memory core means to be sequentially placed in one of said first and second states in response to said sensing means.

8. Apparatus according to claim 7 wherein said movable member comprises a rotatably mounted disc in driven relationship with said holding means whereby said disc rotates in response to movement of said holding means.

9. Apparatus according to claim 8 wherein said source of additional energy waves comprises a light source, said additional sensor means being responsive to light and said disc is apertured at said first portions about its circumference to transmit the light from said light source and opaque at said second portions to prevent transmission of the light from said light source to said additional sensor means.

10. Apparatus according to claim 9 wherein there is a one to one correspondence between the number of apertures traversing said additional energy waves and the number of subsegments traversing said first energy wave at least part of the time that said record means is moved through said housing.

11. Apparatus according to claim 6 wherein said means for providing said first energy wave comprises a light source, said sensing means being responsive to light for providing signals to said memory core means indicative of the reflectance characteristic of each subsegment upon which said light is incident.

12. Apparatus according to claim 11 wherein the surface of said record means includes a region adjacent said origin having a reflectance characteristic other than said one reflectance characteristic and said apparatus further comprises:

means for providing a further energy wave incident upon said region as said record card is moved through said opening substantially immediately before the subsegment nearest said origin receives said first energy wave, further sensor means for sensing the energy reflected by said record means in response to said further energy wave, and resetting means responsive to said further sensor means for enabling the memory core means corresponding to said nearest sub-segment to be placed in one of said first and second states as said first energy wave means is incident upon said nearest subsegment and thereafter sequentially enabling each remaining memory core means to be placed in one of said first and second states as said first energy wave means is incident upon its corresponding subsegment.

13. Apparatus according to claim 6 wherein said measurement means comprises:

means for generating timing signals at equally spaced time intervals and means for counting said time signals, said counting means including an output at which there is provided said output signal having a characteristic with a magnitude indicative of the number of timing signals generated.

14. Apparatus according to claim 6 wherein said measurement means comprises:
a rotatable member which is rotated as a function of said process, and
encoder means fixedly connected to said rotatable member for rotation therewith, said encoder means having an output at which there is provided said output signal having a characteristic with a magnitude indicative of the angular position of said rotatable member.

15. Apparatus according to claim 6 wherein the surface of said record means includes a region adjacent said origin having a reflectance characteristic other than said one reflectance characteristic and said apparatus further comprises:
means for providing a further energy wave incident upon said region as said record means is moved through said opening substantially immediately before the subsegment nearest said origin receives said first energy wave,
further sensor means for sensing the energy reflected by said record means in response to said further energy wave, and
resetting means responsive to said further sensor means for enabling the memory core means corresponding to said nearest subsegment to be placed in one of said first and second states as said first energy wave means is incident upon said nearest subsegment and thereafter sequentially enabling each remaining memory core means to be placed in one of said first and second states as said first energy wave means is incident upon its corresponding subsegment.

16. In apparatus including a plurality of control switches for selectively enabling and disabling a respective process operation associated with each control switch depending on the instantaneous magnitude of a measurement made during the process in accordance with a prescribed program for alternating said process control switches independently during said process between process enabling states and process disabling states, the program being recorded on a record means the surface of which has respective designated areas associated with each respective process control switch, each of which areas are bounded at one end by a common origin and at their opposite ends by a common terminus by independently dividing each said area into adjacent segments alternate ones of which have one reflectance characteristic and the remaining ones of which have a different reflectance characteristic, said segments comprising one or more equally sized subsegments each of which is an analog of an interval within the total range of the magnitude of said measurement, with the total distance between said common origin and said common terminus being an analog of the total measurement magnitude range, each of said respective control switches being in said enabling state when the instantaneous magnitude of the measurement is in an interval having a subsegment in the program area associated with each respective control switch with said one reflectance characteristic as an analog and said respective control switch being in said disabling state when the instantaneous magnitude of the measurement is in an interval having a subsegment in the associated area with said different reflectance characteristic as an analog, the improvement which comprises a housing having an opening through which said record means is moved for programming said apparatus,
means for providing a first energy wave incident upon the subsegments of said designated areas as said record means is moved through said opening,
a plurality of means in one to one correspondence with said control switches for sensing the energy reflected by the subsegments of the area corresponding to each respective control switch in response to said incident energy waves,
a plurality of memory means in one to one correspondence with said control switches, each memory means comprising a plurality of memory core means in one to one correspondence with the subsegments of each program area of said record means each of which memory core means has a first state corresponding to said one reflectance characteristic of said record means and a second state corresponding to said different reflectance characteristic of said record means,
means responsive to movement of said record means through said opening for sequentially enabling one memory core means of each memory means to be simultaneously placed in one of said first and second states in response to said respective sensing means, each enabled memory core means being placed in said first state when its corresponding subsegment in its associated area has said one reflectance characteristic and in said second state when its corresponding subsegment in said associated area has said different reflectance characteristic,
measurement means for determining the instantaneous value of a parameter which value is variable during the process, said measurement means having a measurement output signal with a characteristic having a magnitude indicative of the instantaneous magnitude of said measurement,
means responsive to said measurement output signal for interrogating the memory core means of each of the respective memory means corresponding to the subsegments in the respective associated areas which are analogs of the interval in which said instantaneous magnitude lies in order to determine the state of each respective memory core means in each of the memory means, each of said control switch means being responsive to said interrogating means for being in said enabling state when the interrogated memory core means in the memory means associated with said control switch is in its first state and for being in said disabling state when the interrogated memory core means of the memory means associated with said switch means is in its second state.

17. A universal programmable timer for process control wherein a program for enabling the process is recorded on a record means bounded by an origin and a terminus and sub-divided into subsegments, said subsegments being analogs of time intervals, the distance of the boundaries of each subsegment from said origin being proportional to the respective times of the beginning and end of the time interval of which said subsegment is an analog measured from the start of the process, said program being recorded on said record means by imparting to subsegments which are analogs of time intervals during which said process is to be enabled one reflectance characteristic and to the remaining subsegments a different reflectance characteristic comprising:

a housing having an opening through which said program record means is moved for programming said apparatus, means for providing a first energy wave incident upon said subsegments as said record means is moved through said opening, means for sensing the energy reflected by said subsegments in response to said incident energy wave, a plurality of memory core means in one to one correspondence with said subsegments each of which memory core means has a first state corresponding to said one reflectance characteristic of said record means and a second state corresponding to said difference reflectance characteristic of said record means, means responsive to movement of said record means through said opening for sequentially enabling each memory core means to be placed in one of said first and second states in response to said sensing means, each enabled memory core means being placed in said first state when its corresponding subsegment has said one reflectance characteristic and in said second state when its corresponding subsegment has said different reflectance characteristic, means for generating timing signals at a constant frequency, means for counting said timing signals and providing an output signal with a characteristic having a magnitude indicative of the time elapsed from the commencement of said process, means responsive to said counter output signal for interrogating the memory core means corresponding to the subsegment which is an analog of the time interval in which said instantaneous magnitude lies in order to determine the state of said interrogated memory core means, and control switch means responsive to said interrogating means for enabling said process when said interrogated memory core means is in its first state and for disabling said process when said memory core means is in its second state.

18. Apparatus for enabling and disabling the performance of a process as a function of the position of a machine member movable during the process according to a program recorded on a record means having an area bounded at one end by an origin and at its opposite end by a terminus said area being sub-divided between said origin and said terminus into subsegments each of which subsegments is an analog of an interval in the range of positions of said movable machine member, the distance between said origin and said terminus being an analog of the total range of movement of said machine member with the distance of the boundary points of each subsegment from said origin being proportional to the respective distances of the boundaries of an analogous interval in said range of movement from a start position for said machine part, each subsegment having one reflectance characteristic imparted to it to indicate that said process is to be enabled when said machine part is in an interval of which said subsegment is an analog and a different reflectance characteristic imparted to it to indicate that said process is to be disabled when said machine part is in an interval having said subsegment as an analog, comprising:

a housing having an opening through which said record means is moved for programming said apparatus, means for providing a first energy wave incident upon said subsegments as said record means is moved through said opening, means for sensing the energy reflected by said subsegments in response to said incident energy wave, a plurality of memory core means in one to one correspondence with said subsegments each of which memory core means has a first state corresponding to said one reflectance characteristic of said record means and a second state corresponding to said difference reflectance characteristic of said record means, means responsive to movement of said record means through said opening for sequentially enabling each memory core means to be placed in one of said first and second states in response to said sensing means, each enabled memory core means being placed in said first state when its corresponding subsegment has said one reflectance characteristic and in said second state when its corresponding subsegment has said different reflectance characteristic, encoder means responsive to movement of said machine part for determining the instantaneous position of said machine part and providing an output signal with a characteristic having a magnitude indicative of said instantaneous position, means responsive to said encoder means output signal for interrogating the memory core means corresponding to the subsegment which is an analog of the interval in which said instantaneous magnitude lies in order to determine the state of the interrogated memory core means, control switch means having a first state for enabling said process and a second state for disabling said process, said control switch means being responsive to said interrogating means for being in said enabling state when the interrogated memory core means is in its first state and for being in said disabling state when the interrogated memory core means is in its second state.

19. Apparatus for storing a program in an electronic memory including memory core means each of which is to be placed in a first or second of two states according to the program which is recorded on a designated area of the surface of a record means which area is bounded at one end by an origin and at the opposite end by a terminus and sub-divided into a plurality of sub-segments in one to one correspondence with said memory core means, each of said memory core means occupying a first state when the subsegment corresponding to the respective memory core means has one reflectance characteristic and a second state when the sub-segment corresponding to the respective memory core means has a different reflectance characteristic, comprising a housing having an opening through which said record means is moved for programming said apparatus, means for providing a first energy wave incident upon said sub-segments as said record means is moved through said opening, means for sensing the energy reflected by said subsegments in response to said incident energy wave, means for holding said record means, said holding means being movable with said record means held thereon into said housing opening, additional sensor means responsive to additional energy waves, a source of said additional energy waves incident on said additional sensor means, a movable member disposed in the path through which said additional energy waves travel from said source of additional energy waves to said additional energy wave sensor means, said movable member being operatively connected to said holding means and movable only in response to movement of said holding means, said movable member having spaced first portions and alternating second portions disposed between said first portions, said first portions having a first effect on said additional energy waves incident upon said first portions and said second portions having a second effect on said additional energy waves incident upon said second portions, said first effect differing from said second effect, said member being movably mounted relative to said additional energy source and said additional sensor means so that said first and second portions alternately traverse the path of said additional energy waves from their source to said additional sensor means thereby alternately having said first effect and said second effect on said additional energy signals, said additional sensor means providing one output associated with said first effect and another output associated with said second effect thereby being responsive to the movement of said holder means for providing a signal to said memory core means as each successive sub-segment traverses said first energy wave for enabling said memory core means to be placed in one of said first and second states in response to said sensing means.

20. Apparatus according to claim 19 wherein said movable member comprises a disc rotatably mounted on said housing in driven relationship with said holding means whereby said disc rotates in response to movement of said holding means.

21. Apparatus according to claim 20 wherein said source of additional energy waves comprises a light source, said additional sensor means being responsive to light from said light source, and said disc is apertured at said first portions about its circumference to transmit light from said light source and opaque at said second portions to prevent transmission of light from said light source.

22. Apparatus according to claim 21 wherein the number of said first portions traversing said path of said additional energy waves from their source to said additional sensor means as the entire length of said designated area receives said first energy waves is equal to the number of subsegments in said process control program.

* * * * *